US008626543B2

(12) United States Patent
Liu et al.

(10) Patent No.: US 8,626,543 B2
(45) Date of Patent: Jan. 7, 2014

(54) TRACING SOFTWARE EXECUTION OF A BUSINESS PROCESS

(75) Inventors: Yingzhi Liu, Rotenberg (DE); Hans-Georg Beuter, Heidelberg (DE); Piyush Deora, Bangalore (IN); Mirko Schnack, Mannheim (DE); Carsten Ziegler, Walldorf (DE)

(73) Assignee: SAP AG, Walldorf (DE)

( * ) Notice: Subject to any disclaimer, the term of this patent is extended or adjusted under 35 U.S.C. 154(b) by 75 days.

(21) Appl. No.: 13/269,578

(22) Filed: Oct. 8, 2011

(65) Prior Publication Data

US 2013/0091342 A1  Apr. 11, 2013

(51) Int. Cl.
*G06Q 10/00* (2012.01)

(52) U.S. Cl.
USPC .......................... 705/7.11; 705/7.27; 707/608

(58) Field of Classification Search
USPC ......... 1/1; 707/601–752, 999; 705/7.11–7.42, 705/301, 348; 709/202–242; 717/100–135; 719/315–328; 726/21–26
See application file for complete search history.

(56) References Cited

U.S. PATENT DOCUMENTS

| | | | | |
|---|---|---|---|---|
| 6,047,283 | A * | 4/2000 | Braun ................................. | 1/1 |
| 6,449,624 | B1 * | 9/2002 | Hammack et al. .................. | 1/1 |
| 6,704,723 | B1 * | 3/2004 | Alavi et al. ......................... | 1/1 |
| 7,542,980 | B2 * | 6/2009 | Tsyganskiy et al. ................ | 1/1 |
| 7,574,501 | B2 * | 8/2009 | Louie et al. ................... | 709/224 |
| 7,698,186 | B2 * | 4/2010 | Botzer et al. .................. | 705/35 |
| 7,720,803 | B2 * | 5/2010 | Unnebrink et al. ........... | 707/601 |
| 7,752,607 | B2 * | 7/2010 | Larab et al. ................... | 717/135 |
| 7,774,798 | B2 * | 8/2010 | Rapp et al. .................... | 719/328 |
| 7,908,160 | B2 * | 3/2011 | Bhargava ..................... | 705/7.41 |
| 7,954,011 | B2 * | 5/2011 | Ivanov et al. ................... | 714/45 |
| 8,005,736 | B2 * | 8/2011 | Botzer et al. .................. | 705/35 |
| 8,108,234 | B2 * | 1/2012 | Suenbuel et al. ............ | 705/7.11 |
| 8,234,248 | B2 * | 7/2012 | Karimisetty et al. ......... | 707/639 |
| 2002/0087949 | A1 * | 7/2002 | Golender et al. ............ | 717/124 |
| 2002/0157017 | A1 * | 10/2002 | Mi et al. ........................ | 713/200 |
| 2003/0050789 | A1 * | 3/2003 | Hasson et al. .................... | 705/1 |
| 2003/0204503 | A1 * | 10/2003 | Hammer et al. .................. | 707/6 |
| 2005/0071342 | A1 * | 3/2005 | Calusinski .................... | 707/100 |
| 2005/0097434 | A1 * | 5/2005 | Storisteanu .................. | 715/500 |
| 2005/0119905 | A1 * | 6/2005 | Wong et al. ...................... | 705/1 |
| 2005/0171833 | A1 * | 8/2005 | Jost et al. ........................ | 705/10 |

(Continued)

OTHER PUBLICATIONS

Foster, Howard, et al. "Model-based verification of web service compositions." Automated Software Engineering, 2003. Proceedings. 18th IEEE International Conference on. IEEE, 2003.*

(Continued)

*Primary Examiner* — Alan S Miller

(57) ABSTRACT

Various embodiments of systems and methods to trace an execution of a business process are disclosed. Business rules and corresponding business objects required to execute the business process are identified and rendered to receive an input. Based upon detecting a trigger to execute the business process, the business rules and the corresponding business objects are processed to compute a process-resultant for the business process. A process-path of the computed process-resultant is traced by tracing key-strings corresponding to the business objects involved in computing the process-resultant, to generate a trace-resultant. The trace-resultant is parsed by determining versioned business objects and business information of the key-strings, to derive a business definition for the traced business objects involved in computing the process-resultant. Based upon the business definition, a comprehensive trace-map comprising a compilation of the process-resultant to execute the business process is generated.

20 Claims, 4 Drawing Sheets

(56) References Cited

U.S. PATENT DOCUMENTS

| | | | |
|---|---|---|---|
| 2006/0026166 A1* | 2/2006 | Sattler et al. | 707/10 |
| 2006/0085336 A1* | 4/2006 | Seubert et al. | 705/40 |
| 2006/0123022 A1* | 6/2006 | Bird | 707/100 |
| 2006/0143034 A1* | 6/2006 | Rothermel et al. | 705/1 |
| 2006/0242207 A1* | 10/2006 | Tsyganskiy et al. | 707/203 |
| 2007/0006174 A1* | 1/2007 | Sohm et al. | 717/131 |
| 2007/0021995 A1* | 1/2007 | Toklu et al. | 705/7 |
| 2007/0027801 A1* | 2/2007 | Botzer et al. | 705/39 |
| 2007/0192478 A1* | 8/2007 | Louie et al. | 709/224 |
| 2007/0239711 A1* | 10/2007 | Unnebrink et al. | 707/6 |
| 2007/0256084 A1* | 11/2007 | Rapp et al. | 719/320 |
| 2007/0265868 A1* | 11/2007 | Rapp et al. | 705/1 |
| 2007/0294318 A1* | 12/2007 | Arora et al. | 707/202 |
| 2008/0004856 A1* | 1/2008 | Avitzur et al. | 703/17 |
| 2008/0059517 A1* | 3/2008 | Glania et al. | 707/103 X |
| 2008/0155349 A1* | 6/2008 | Ivanov et al. | 714/45 |
| 2008/0228536 A1* | 9/2008 | Suenbuel et al. | 705/7 |
| 2008/0256172 A1* | 10/2008 | Hebert et al. | 709/202 |
| 2008/0263503 A1* | 10/2008 | Polly et al. | 717/100 |
| 2009/0099994 A1* | 4/2009 | Brelage et al. | 706/47 |
| 2009/0112908 A1* | 4/2009 | Wintel et al. | 707/102 |
| 2009/0193054 A1* | 7/2009 | Karimisetty et al. | 707/103 Y |
| 2009/0259455 A1* | 10/2009 | Becker | 703/22 |
| 2010/0042745 A1* | 2/2010 | Maeda et al. | 709/242 |
| 2010/0088270 A1* | 4/2010 | Ziegler | 707/609 |
| 2010/0319067 A1* | 12/2010 | Mohanty et al. | 726/21 |
| 2012/0166454 A1* | 6/2012 | Chen | 707/752 |
| 2012/0259793 A1* | 10/2012 | Umansky et al. | 705/348 |
| 2012/0260133 A1* | 10/2012 | Beck et al. | 714/38.1 |

OTHER PUBLICATIONS

Hepp, Martin, et al. "Semantic business process management: A vision towards using semantic web services for business process management." e-Business Engineering, 2005. ICEBE 2005. IEEE International Conference on. IEEE, 2005.*

Leymann, Frank, Dieter Roller, and M-T. Schmidt. "Web services and business process management." IBM systems Journal 41.2 (2002): 198-211.*

Heinrich, Bernd, et al. "The process map as an instrument to standardize processes: design and application at a financial service provider." Information systems and e-business management 7.1 (2009): 81-102.*

Akkiraju, Rama, and Anca Ivan. "Discovering business process similarities: An empirical study with SAP best practice business processes." Service-Oriented Computing. Springer Berlin Heidelberg, 2010. 515-526.*

* cited by examiner

TRACING SOFTWARE EXECUTION OF A BUSINESS PROCESS

TECHNICAL FIELD

The field generally relates to computer systems and software, and more particularly to software methods and systems to trace software execution of business processes.

BACKGROUND

Content management relates to managing the content involving digital data of a group of business enterprises. This promotes effectiveness and efficiency of business processes that are carried out using the digital data. Business process management may be described as a part of content management that is responsible for aligning the business data of the enterprise with a business requirement. The activities of business process management generally include designing, modeling, executing, monitoring and optimizing the business process.

Monitoring the business process includes tracking of individual processes that are involved in achieving an end result. Tracking of business process is useful to understand business logics involved in executing the process and to make corresponding business decisions. For instance, a business process executed in an enterprise may include a field work, an intellectual work, an oversight carried out to complete a task and the like. Each individual process may further include certain specifications that are useful in determining daily wages of employees executing the business process. Such statistical information may be derived by tracing the business process and analyzing events that have occurred during the process. However, the process of tracing involves analyzing enormous amount of business data, thereby creating an overload for an associated business processor. Hence, providing a tracing mechanism that can act upon the massive business data and comprehend the business logics involved in the business process is useful.

SUMMARY

Various embodiments of systems and methods to trace a software execution of a business process are disclosed. In an embodiment, business rules and corresponding business objects required to execute the business process are identified and rendered to receive an input. Based upon an instruction to trigger a software execution of the business process, the business rules and the corresponding business objects are processed to compute a process-resultant for the business process. A process path of the computed process-resultant is traced by tracing a key-string of the business objects involved in computing the process-resultant, to generate a trace-resultant. In an embodiment, tracing the key-string includes tracing a key-identifier and a key-value of the business objects involved in computing the process-resultant. In an embodiment, tracing the key-string also includes tracing a time-stamp of the business objects. The trace-resultant is parsed by determining versioned business objects and business information of the key-strings, to derive a business definition for the traced business objects involved in computing the process-resultant. Based upon the business definition, a comprehensive trace-map comprising a compilation of the process-resultant to execute the business process is generated.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Figure 1:
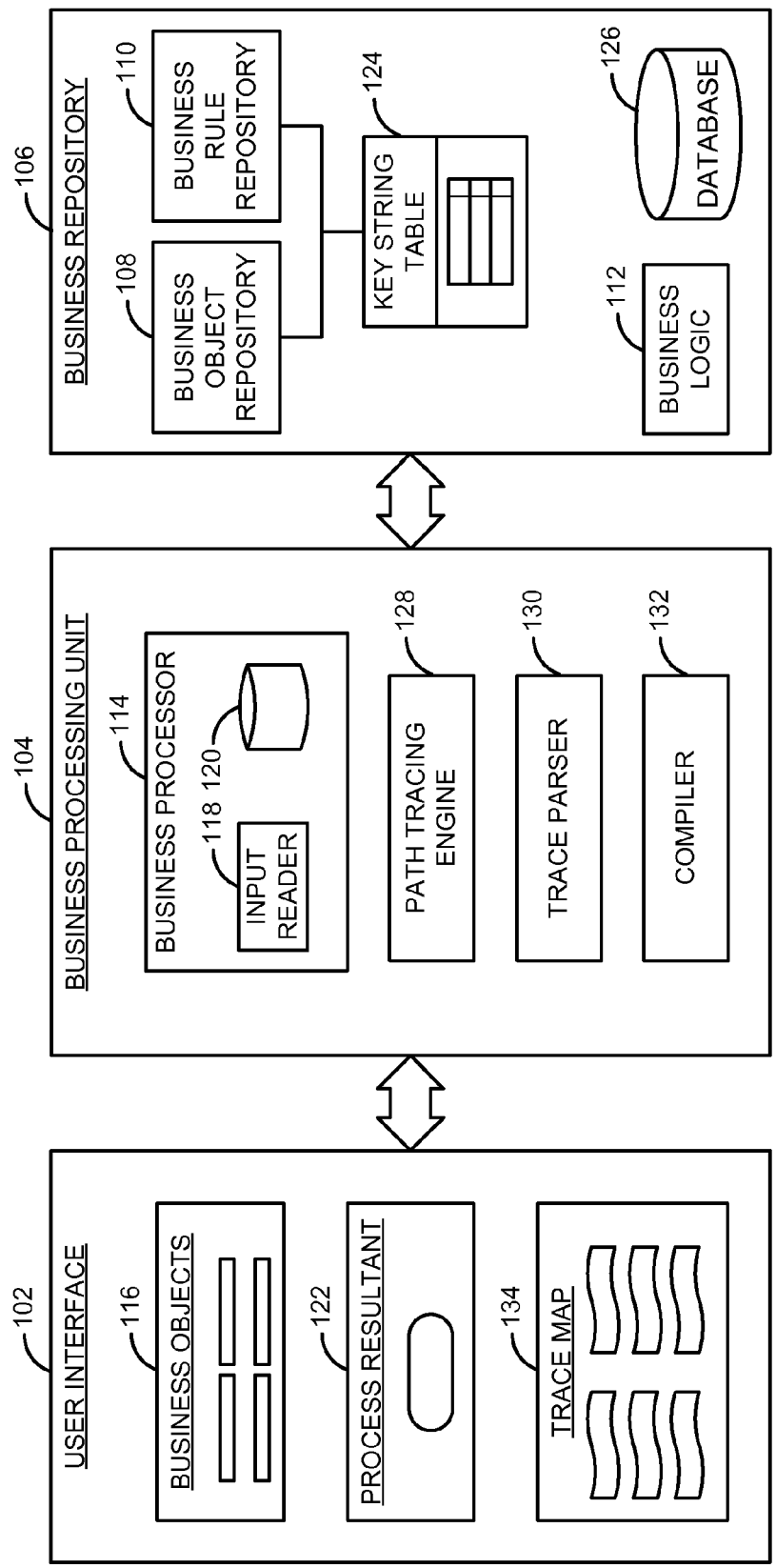
FIG. 1 is a block diagram illustrating an overview of a system to trace a execution of a business process, according to an embodiment.

Embodiments of techniques for systems and methods to trace an execution of a business process are disclosed herein. Business process may include business rules and business objects involved in executing the business process. These business rules may define a manner in which the business objects have to be applied to execute the business process. In an embodiment, the business objects are configured to receive an input from a user, and based upon the received input, business logic associated with the business rules may define the application of the received inputs to the business objects corresponding to the business rules. Based upon an instruction to trigger the execution of the business process, the business rules are processed by processing the business objects, and a process-resultant of the business process is computed. The process-resultant may be a business result desired for the business process. For instance, for a business process of calculating daily wages for fifty employees of an organization, the process-resultant may be the amount of the daily wages paid to each employee; and to calculate the amount to be paid, business objects such as number of hours worked, and type of work done may be considered. Based upon the input received for the business objects, the business rules (e.g., formulae to calculate the daily wages) are processed by applying the business logic to the business rules to compute the process-resultant (e.g., daily wages).

In a business environment, business logic involved in computing a process-resultant may need to be understood may be analyzed to make various business decisions. For instance, a type of work done may include type of field work, type of intellectual work, type of oversight carried out to complete a task, and the like. Each type of work may further include certain specifications required to determine an employee's daily wages. Thus, comprehending the procedures followed to execute a business process and generate a process-resultant may be helpful. To create a comprehensive map describing a compilation of the process-resultant, a tracing mechanism is applied to trace the business rules, the corresponding business objects and the other parameters that are involved in computing the process-resultant. The tracing mechanism thus applied creates a trace-resultant by tracing a process-path of the computed process-resultant. Furthermore, the trace-resultant is parsed to derive a business definition for the traced business processes involved in computing the process-resultant. Based upon the business definition, a comprehensive trace-map is generated, that describes the compilation of the process-resultant to execute the business process.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

FIG. 1 is a block diagram illustrating an overview of a system to trace a software execution of a business process, according to an embodiment. Business processes in large enterprises typically involve enormous amounts of business data structured according to particular requirements for generating intended results. A business process may be described as an arrangement of a collection of inter-dependent actions with a purpose of achieving an intended result.

Business processes may include a set of business rules that define certain aspects of the business process. The business rules may be associated with the business process for purposes of making the business process—effective to an extent of arriving at desirable outputs, efficient with reference to time taken to execute the business process and performance of the business process, and for controlling the flow of business data involved in executing the business process. Thus, depending upon factors such as the output desired, the time and performance, and the manner of flow of business data, a specific set of business rules may be associated with each business process. Business rules may also be defined as formulae applied to a region of data to execute an associated business process. Examples of business rules include currency translations, allocations, and simple mathematical calculations.

The business rules include business objects that are business entities describing definitions, criteria and operations of the business process. Business objects describe a structure and behavior of a real-world object. A business object includes a hierarchy of business object nodes, which represent the data, and bundles functions along with the data. Business objects may accept business input from a user, and based upon the business rules associated with corresponding business processes, the business input is processed to execute the business process and a business resultant is generated as a result of the execution. The data comprised in the business object may be referred to as business information. In an embodiment, business logic describes a principle or a functional algorithm to handle the business rules, the business objects and any business information required to execute the business process. The business logic may comprise the business rules and may define the manner of interaction of business objects with one another, within the business rules, and the like.

For instance, a business process DETERMINATION OF PROFIT OF ITEM 'A' may include two business rules CALCULATE A TOTAL INCOME FOR ITEM 'A' and CALCULATE A TOTAL EXPENSE FOR ITEM 'A'. The two business rules may further include business objects SELLING PRICE, COST PRICE and DISCOUNT that accept business input from a user. Based upon receiving an instruction to trigger an execution of the business process, the business rules and the business objects are processed. In an embodiment, a business rule may further include one or more business rules and corresponding business objects to describe a formula to execute the business process.

In a business environment, the functional algorithms involved in handling business information of the business process have to be analyzed to make various business decisions. This analysis may be implemented to consider the entities involved in the business process, to perform a detailed study of parts of the entities and their relationships in generating the entity, and to obtain a comprehensive explanation of the procedure followed to arrive at a resultant of the business process. To accomplish this analysis, a mechanism of tracing the business process may be followed. Tracing the execution of a business process includes analyzing a development of the business input into a business resultant. Tracing involves analyzing the procedural steps of the business process by analyzing business data present in the business objects at regular intervals of the business process. Tracing a business process enables tracing the enormous business data present in the business process. Tracing also enables providing a comprehensive explanation of the process followed to arrive at the business resultant. Hence, tracing business data that is sufficient to provide the comprehensive explanation causes efficient utilization of a business processor operable to execute the business process.

Block 100 illustrates an overview of a system to trace an execution of a business process, according to an embodiment. Block 100 comprises a computer generated user interface (UI) 102 including an UI element representing the associated business object 116, an UI element representing the process-resultant 122 and an UI element representing the trace map 134; business processing unit 104 including business processor 114, input reader 118, memory element 120, path tracing engine 128, trace-parser 130 and compiler 132; business repository 106 including business object repository 108, business rules repository 110, business logic 112, key-string table 124 and database 126.

User interface (UI) 102 is utilized for establishing interactions between a user and the backend of a system to trace the execution of a business process. In an embodiment, UI 102 includes UI element 116 representing a set of one or more business objects, UI element 122 representing a process resultant and UI element 134 representing a trace map. Business object associated with the selected business process may be residing in business object repository 108, and business rules associated with the selected business process may be residing in business rules repository 110. Business logic 112 includes the functional algorithm to handle the business rules and the business objects involved in executing the business process.

In an embodiment, a user selects a business process from a group of business processes available on UI 102. Based upon a selected business process, business rules and their corresponding business objects involved in executing the business process are identified. In an embodiment, the business objects that are operable to receive an input are rendered on UI 102 as UI elements (for e.g., 116). For instance, a first business rule may include a first business object and a second business object; a second business rule may include a third business object and a fourth business object. The execution of the selected business process may require processing of both the business rules (i.e. first business rule and second business rule). The first business object and the fourth business object may be operable to receive an input. However, the second business object and the third business object may not be operable to receive an input. In such cases, only the first business object and the fourth business object are rendered as UI elements 116 on UI 102. In another embodiment, only one of the two business rules may be required for execution of the business process. In such cases, only the business objects corresponding to the required business rule may be rendered on UI 102.

In an embodiment, UI 102 includes an option to execute the selected business process, and the user is provided with an option to trigger the execution. The business processor 114 recognizes an instruction to trigger the execution the business process, and executes the business process by processing the business rules and their corresponding business objects associated with the business process. According to one embodiment, input reader 118 included in business processor 114 is responsible for assigning a received input for a corresponding business object, and storing the received input along with an identification of the corresponding business object in memory element 120. In an embodiment, the business object is stored in the memory element 120 along with the received input. Based upon the received input, business processor 114 processes the business rules and their corresponding business objects associated with the business process. In an embodiment, the business rules and their corresponding business objects associated with the business process include dependant business rules and dependant business objects. A dependant business rule may be described as a child business rule that depends on a parent business rule in a hierarchy of business rules involved in executing the business process. Similarly, a dependant business object may be described as a child business object that depends on a parent business object in a hierarchy of business objects involved in executing the business process. For instance, a first business rule BR1 may include business objects BO1 and BO2, and the first business rule may be described as BR1=BO1+BO2. Further, BO7 and BO9 may be dependent on BO1, described as BO1=BO7* (BO9/2). According to the above relation, BO7 and BO9 may be necessary to calculate BO1; or BO7 and BO9 may need to be processed to process BO1. Although they are not directly involved in executing a business process, the dependant business rules and dependant business objects may be required to process the business rules and the corresponding business objects associated with the business process. Hence, during processing of the business rules, business processor 114 identifies one or more such dependant business rules and/or dependant business objects involved in executing the business process.

Processing the business rules and the corresponding business objects includes preparing the business rules and the corresponding business objects to undergo a prescribed set of logical operations on the data present in the business rules and the corresponding business objects, to obtain a required process-resultant. Preparing the business rules and the corresponding business objects may further include:

identifying one or more dependant business rules;
identifying one or more dependant business objects;
identifying a hierarchy that includes the business objects involved in executing the business process, and identifying one or more business rules and/or one or more business objects existing in the hierarchy;

substituting a value of one or more business objects with the corresponding received input, executing one or more business rules by substituting the relevant business objects and the value of the business objects based upon the received input; and the like.

For instance, for a business process of calculating daily wages for the employees of an organization, a desired outcome may be the amount of the daily wages paid to each employee. To calculate the amount to be paid, business objects such as number of hours worked and type of work done may be considered. Based upon the input received for the business objects, the business rules (e.g., the formulae to calculate the daily wages) are processed.

Based upon the processing of the business rules and corresponding business objects, business processor 114 computes a process-resultant for the business process. The process-resultant may be described as a business result that is desired for the business process. The process-resultant is an outcome of the processing of business rules and their corresponding business objects associated with the business process. For instance, for a business process of calculating daily wages for the employees of an organization, the process-resultant may be the amount of the daily wages paid to each employee. In an embodiment, the process-resultant is stored in memory element 120. Business processor 114 may display the process-resultant as a UI element 122 on UI 102. In an embodiment, business processor 114 stores the process-resultant in database 126.

To provide an understanding of the logic involved in computing the process-resultant, a tracing mechanism is applied to trace the business rules and corresponding business objects and other parameters involved in computing the process-resultant. Tracing may be described as a process of detecting the steps followed while executing the business process, to arrive at the process-resultant. Path tracing engine 128 traces a process-path of the computed process-resultant by detecting the steps followed to compute the process-resultant. Tracing the process-path includes tracing a key-string of the business objects involved in computing the process-resultant.

A key-string may be described as a fundamental identification sequence of business object information that includes comprehensive information about the business object. The key-strings include key-identifiers and key-values of business objects, wherein the key-identifiers are unique expressions identifying corresponding business objects. The key-value may be a system generated value based upon a corresponding business rule or a user input received from the computer-generated user interface or may be a constant for a corresponding business process, or a resultant of a related business process, or the like. The key-string may also include a time-stamp denoting a date and time associated with the business object, for instance, a time and date at which the business object was created, modified, moved from one destination to another and the like. In an embodiment, key-string table 124 may be generated for the business rules and their corresponding business objects residing in business rule repository 110 and business object repository 108. The key-string generated for each business object is typically unique. For example, a business object BO1 is associated with a key-string KS1=BO1–123/344/20:05-10-22-2009, where BO1–123 denotes the key-identifier, 344 denotes the key-value and 20:05-10-22-2009 denotes the time-stamp of the business object.

Business information or a business definition associated with the business rules and their corresponding business objects are subject to modifications during a lifecycle of a business process. With reference to the above example of the key-string, for a modified business object BO1', the key-string KS1'=BO1'-1234/345/20:05—Oct. 22, 2010, where BO1'-1234 denotes the key-identifier of the modified BO1', 345 denotes a modified key-value and 20:05—Oct. 22, 2010 denotes a time-stamp at which the business object was modified.

The definition of the business rule may include a name, description, content of the business rule, and the like. The definition of a business object may include a name, a description, a data structure, a business value, content of the business object and the like. In an embodiment, the business rules and/or the business objects may be modified to accommodate new parameters, or to revise a desired output of the business process, or the like. The business objects of a previous instance may be revised to match with a current instance. In such instances, a modified business object may be created based upon a modification applied to a related business object. Such modified business objects are versioned and the versioned business objects are stored in business object repository 108. For instance, the versions of a business object BO1 having a key-value 344 generated at (timestamp) 04:00 Dec. 25, 2011 may include—a first modified version BO1' having a key-value 345 generated at 05:00 Dec. 26, 2011; a second modified version BO1" having a key-value 350 generated at 18:00 Dec. 26, 2011; and a third modified version BO1'" having a key-value 360 generated at 19:00 Dec. 27, 2011. Versioning of business objects includes a process of assigning a unique key-string to the modified business objects. For instance, a unique key-string is assigned to BO1', BO1" and BO1'" due to the unique key-value and the unique time-stamp associated with them.

Versioning of modified business objects helps in retaining the original business object along with its modified versions. Thus, the original business object and its modified versions are associated with their own unique key-strings. With reference to the above example, BO1' is a first version of BO1. Hence, BO1' is associated with a unique key-string KS1'; BO" is a second version of BO1. Hence, BO1" is associated with a unique key-string KS1"; and BO1'" is a third version of BO1. Hence, BO1'" is associated with a unique key-string KS1'". The key-identifier and the time-stamp associated with the unique key-string helps in determining the version of the business object. The unique key-string associated with the versioned business objects are updated in a key-string table 124. The unique key-strings of the business objects (the original and its modified versions) includes unique key-identifier to identify the versions of the business object, the key-value and a unique time-stamp to determine a time at which the modification was performed on the business object. This time-stamp helps distinguishing between a latest modification of the business object, an original version of the business object, an intermediate version, and so on.

In an embodiment, path tracing engine 128 traces all the parameters of the business object including an input, a value, an identifier, a resultant, and the like, and this information may differ for different business objects. For instance, an input received for a first business object may be in a table format, and an input received for a second business object may be in a graphical format. To trace the business objects, a universal format may be required. Hence, path tracing engine 128 may convert the parameters of the business object into a universal format, for instance a key-string having a key-identifier and a key-value along with a time-stamp. This method of conversion makes the parameter storage format independent from the business object definition, and facilitates tracing one or more values of each parameter associated with the business objects.

Path tracing engine 128 traces the process-path of the computed process-resultant by tracing the key-strings of all the business objects involved in computing the process-resultant. Path tracing engine 128 generates a trace-resultant describing the path followed to compute the process-resultant. For instance, to execute a business process BP1, business rules BR1 and BR2 are identified. To execute BP1, BR1 and BR2 have to be processed as: BP1=BR1+BR2. The business rules may be described as: BR1=(BO1+BO2)*BO3 and BR2=BO4+BO5, where BO1, BO2, BO3, BO4 and BO5 denote the business objects. A process-resultant may be computed as 15435 for BP1 based upon processing the BR1 and BR2.

Path tracing engine 128 traces the process-path of process-resultant 15435 to generate the trace resultant illustrated in table 1.

TABLE 1

TRACE RESULTANT

| BUSINESS OBJECT IDENTIFIER | BUSINESS OBJECT VALUE | TIME-STAMP | BUSINESS DEFINITION |
|---|---|---|---|
| BO1-1234 | 344 | 00:00 Oct. 22, 2010 | BO1 = Number of item 'A' sold This includes the sales of item 'A' at three locations |
| BO2-2356 | 255 | 07:05 Oct. 22, 2010 | BO2 = Number of item 'B' sold This includes the sales of item 'B' at three locations |
| BO3-3467 | 25 | 14:15 Oct. 22, 2010 | BO3 = Cost Price This defines the cost incurred in producing the items 'A' and 'B' |
| BO4-2336 | 360 | 18:30 Oct. 22, 2010 | BO4 = Time taken to see the product 'A' |
| BO5-6650 | 100 | 20:05- Oct. 22, 2010 | BO5 = Time taken to see the product 'B' |

In an embodiment, there exists a possibility of tracing the business data that are not essential to explain the execution of the business process. This may occur when the processor traces the business definition of the business rules and the business objects involved in executing the business process. The business definition may not be essential in explaining the execution of the business process, since the business definition may be derived from the key-string of the associated business object. According to an embodiment, a lean-tracing mechanism may be used to trace the process-path of the computed process-resultant. The lean-tracing mechanism may be described as a tracing mechanism that traces a minimum set of information that is sufficient to detect the steps followed while computing the process-resultant. For instance, a lean-tracing mechanism may trace only a key-string of a business object rather than tracing the business definition of the business object. For example, with reference to Table 1, the first three columns representing the business object identifier, business object value and timestamp are sufficient to detect the steps followed while computing the process-resultant. The fourth column representing the business definition is not essential in determining the process-resultant. In an embodiment, the path tracing engine 128 traces a minimum information including a key-identifier, a key-value and a time-stamp of the business objects involved in computing the process-resultant. In an embodiment, the minimum information will at least include the key-identifier, the key-value and the time-stamp of the business object.

Path tracing engine 128 does not trace any other business information that may be associated with the business object.

By excluding all other business information, path tracing engine 128 traces comparatively a small amount of data instead of tracing the enormous data present in the business environment. By utilizing the versioned business objects, lean trace may be performed to evaluate and demonstrate the steps followed to compute the process-resultant. For instance, by performing lean-tracing, a key-identifier, a key-value, a time-stamp of each business object and/or each versioned business object involved in computing the process-resultant is traced by path tracing engine 128. Thus, the lean-tracing mechanism reduces the workload of tracing an entire business definition of each business object involved in computing the process-resultant. Also, a complete set of original business objects and versioned business objects are identified and available for evaluating and demonstrating purposes.

According to another embodiment, strategic-tracing mechanism may be used to trace the process-path of the computed process-resultant. The strategic-tracing mechanism may be described as a tracing mechanism that traces relevant information required to evaluate and demonstrate the steps followed while computing the process-resultant. For instance, a business object 'PRODUCT RATING' involved in computing a process-resultant 'MARKETING STRATEGY' may include business information such as 'SALES INFORMATION', 'GEOGRAPHIC INFORMATION', 'QUALITY INFORMATION', 'PURCHASE ORDERS RECEIVED', 'DURATION FOR PRODUCTION', 'LOGISTICS FOR SALES', 'DEMOGRAPHY OF WORKMEN', and 'BANK INFORMATION'. While processing the business objects to compute the process-resultant, business processor 114 considers the business information, and utilizes the business information required to compute the process-resultant. However, while performing strategic-tracing, business information like 'DEMOGRAPHY OF WORKMEN' and 'BANK INFORMATION' that do not contribute to the computation of the process-resultant may be excluded from being traced. Path tracing engine 128 may consider only the business information required to evaluate the computation of the process-resultant.

Here, the relevant information may be described as that business information associated with the business object that is directly related to the business rules and the business object that are necessary to execute the business process. Any business information that has no relevance with the computed process-resultant may be skipped while tracing the process-path. For instance, business processor may evaluate many steps during the executing of the business process to arrive at the desired result. These steps may include business rules and business objects that are directly not required to execute the business process. Though this information is required to compute the process-resultant, the information may be irrelevant with reference to the computed process-resultant. Such information, for instance, dependant business rules or the dependant business objects that exist in a hierarchy of the business rules involved in executing the business process and the like, may be excluded during the process of strategic-tracing.

For example, consider a business case where a computation of a process-resultant may include several mathematical formulae containing multiple condition branches. To compute the process-resultant for this business case, each branch is processed, until a branch that meets all the conditions is found. However, while carrying out strategic-tracing, path tracing engine 128 traces only the condition branch that meets the condition, since that is the only true-branch that leads to the process-resultant. The one or more false-branches that do not meet the conditions are not traced.

In another embodiment, path tracing engine 128 excludes unnecessary values of the process-resultant while strategically tracing the process-path. For instance, when a business object has a constant value, the value can be derived from the business definition of the business object. In such cases, path tracing engine 128 does not trace the value unnecessary for computing the process-resultant. For example, a business object BO5 may have a value BO5=47. Here, path tracing engine 128 need not trace the value '47' to determine any information that is unknown by the expression of the business object.

In another example where a decision table is being traced, business processor 114 may process one or more condition cells present in the decision table to compute a resultant in a result cell. When the result of such a decision table is traced, path tracing engine 128 may exclude tracing the condition cells, since the condition cells should have already been satisfied for the result cell to be generated.

In an embodiment, the tracing mechanism includes a tracing buffer. The tracing buffer may be described as a persistent storage medium that stores business data that may have resulted from tracing, at regular instances of the business process. While tracing multiple business rules, multiple sets of process-path may need to be traced. Instead of establishing a connection with database 126 for each process-path traced, a tracing buffer may be used to temporarily store the traced data, and based upon a completion of tracing of all the business rules associated with the business process, the tracing buffer may establish a communication with database 126 to persist the entire collection of data in database 126. The method of using the tracing buffer may reduce the utilization of business processing unit 104 for transferring the data during mass processing.

The tracing mechanism thus applied generates a trace-resultant by tracing the process-path of the computed process-resultant. The trace-resultant is persisted into database 126 by path tracing engine 128. In an embodiment, the trace-resultant is regarded as encoded business information, since the traced business data is not directly available for analysis. In other words, the mechanism of tracing involves tracing the key-string of business objects and/or business rules, rather than tracing the enormous business information that is persisted in the business object and/or business rule involved in computing a process-resultant for the business process.

Further, trace parser 130 retrieves the persisted trace-resultant, which is a minimal amount of data compared to the enormous business data involved in computing the process-resultant, and parses the trace-resultant to derive a business definition for the traced business objects and business rules involved in computing the process-resultant. Parsing generally involves detecting, evaluating and explaining or demonstrating the traces involved in the process-path. During parsing, all the business logic involved during tracing is applied again to decode the encoded business data. For instance, while performing tracing, minimal amount of data is considered to provide an understanding of the business logic involved in computing the process-resultant. To execute the process of parsing, the encoded business information needs to be decoded to derive a complete set of business information of the process-path followed to compute the process-resultant.

While parsing, trace parser 130 determines the versioned business objects and business information of the key-strings traced by path-tracing engine, to derive a business definition for the traced business objects and/or business rules involved in computing the process-resultant. To derive the business definition, trace parser 130 determines the key-identifier and the key-value included in the key-string of each traced business object. Based upon the key-identifier, trace parser 130 determines the business information corresponding to the traced business object. Based upon the key-value, trace parser 130 determines a business input received for the corresponding traced business object. Further, trace parser 130 determines one or more versioned business objects that are associated with the key-string of the corresponding traced business object.

Compiler 132 compiles the versioned business objects, the key-identifier and the key-value of each traced business object, and the business information comprised in each traced business object to derive a business definition for the corresponding traced business object. Compiler 132 may be responsible for translating the encoded business data into computer readable information that can be executed to derive the business definition. Further, compiler 132 evaluates the business definition to identify the business objects involved in computing the process-resultant, and maps the business information present in the business definition to the corresponding business objects and business rules. Complier 132 also maps the versioned business objects to the original business objects and the corresponding business rules. Compiler 132 generates a comprehensive trace-map including the business definition, the business information, the versioned business objects and the business objects and business rules involved in computing the process-resultant. The comprehensive trace-map may be described as a resultant of the evaluation of the process-resultant and demonstration of the trace-resultant. The comprehensive trace-map thus provides an explanation of the process of computing the process-resultant of an executed business process. The comprehensive trace-map describes the processing of the business rules, including the inputs, the processing steps and the output of the business rules, along with the business objects involved in the computation, their relationships with each other, and their dependencies. Business processor 114 may display the comprehensive trace-map as a UI element 134 on UI 102. This trace-map may be utilized for further business analysis to make business decisions.

A business case example for illustrating a method to trace an execution of a business process, according to an embodiment, is explained herein. A business process of ANNUAL BONUS DETERMINATION for year 2011 or an extra pay for good performance is considered. For ANNUAL BONUS DETERMINATION of an employee ROBERT, business processor 114 included in business processing unit 104 identifies business rules and business objects from business rule repository 110 and business object repository 108 respectively. Business rules include one or more formulae to calculate the annual bonus for ROBERT, and business objects include parameters of the formula. In this business case example, the formula to determine the annual bonus is:

$$Bonus_{2011} = (AS \times PR) + \left(H \times \frac{AS}{D}\right)$$

Where AS denotes the ANNUAL SALARY of ROBERT for 2011; PR denotes a PERFORMANCE RATING of ROBERT, which may be described as a parameter based upon which ROBERT's performance is measured; H denotes a NUMBER OF EXTRA HOURS OF WORK done by ROBERT; and D denotes NUMBER OF DAYS in the year 2011. Business rules may be identified with identifiers BR1 and BR2 representing a first business rule and a second business rule. Similarly business objects may be identified with represented by BO1, BO2, BO3, and BO4 for a first business object, a second business object, a third business object, and a fourth business object.

Accordingly, BR1 and BR2 are expressed as:

$$BR1 = (AS \times PR)$$

$$BR2 = \left(H \times \frac{AS}{D}\right)$$

The first business rule BR1 includes two business objects namely BO1 and BO2 denoted as AS and PR respectively. The second business rule BR2 includes three business objects namely BO3, BO1 and BO4 denoted as H, AS and D respectively. Business processor 114 determines the business objects included in the business rules, and renders the business objects operable to receive an input to execute the business process. Accordingly, business processor 114 renders BO1, BO2, and BO3 as UI element 116 on UI 102 to receive user inputs. Business processor 114 did not render BO4 since BO4 is a constant for the year 2011.

The below table—Table 2—illustrates the UI element 116 that includes BO1, BO2, and BO3 along with their business object field describing the business object and business object value describing the input received.

TABLE 2

| BUSINESS OBJECTS | | |
|---|---|---|
| BUSINESS OBJECT IDENTIFIER | BUSINESS OBJECT FIELD | BUSINESS OBJECT VALUE = INPUT RECEIVED |
| BO1 | Annual Salary | 3000 USD |
| BO2 | Performance Rating | = |
| BO3 | Extra Hours of Work | 38 |

Based upon an instruction to trigger the execution of the business process, business processor 114 processes the business rules BR1 and BR2 along with the business objects BO1, BO2, BO3, and BO4 to compute a process resultant BONUS. According to the business rule for determining annual bonus, a process resultant BONUS=3912 is computed. In an embodiment, a decimal numeric value computed as a process-resultant is rounded off to the nearest integer.

Path tracing engine 128 traces a process-path followed to compute the process-resultant. The process-path is traced by tracing the key-strings corresponding to the business objects involved in computing the process-resultant. Path tracing engine 128 may generate the following table—Table 3—including the key-strings corresponding to the traced business objects as a trace-resultant.

TABLE 3

| TRACE RESULTANT | | | |
|---|---|---|---|
| | KEY-STRING | | |
| BUSINESS OBJECT IDENTIFIER | KEY-IDENTIFIER | KEY-VALUE | TIMESTAMP (DD/MM/YYYY; HH:MIN) |
| BO1 | 1111 | 3000 | Jul. 25, 2011; 21:45 |
| BO2 | 2222 | 0.12 | Dec. 1, 2010; 23:00 |
| BO3 | 3333 | 38 | Dec. 29, 2010; 23:00 |
| BO4 | 4444 | 365 | Jul. 25, 2010; 21:45 |

The trace-resultant is parsed by trace parser 130, by determining the versioned business objects and the business information of the key-strings, to derive a business definition for the traced business objects involved in computing the process-resultant. Trace parser 130 parses trace resultant by determining versioned business objects, if any, and business information of the key-strings, to derive a business definition for the traced business objects. The determined version business objects and the business information of the key-strings may be rendered as Table 4.

TABLE 4

| BUSINESS OBJECT | VERSIONED BUSINESS OBJECT WITH TIMESTAMP | BUSINESS DEFINITION OF BUSINESS OBJECT-INCLUDING TIMESTAMP, INPUT RECEIVED, DEPENDENCIES, ETC |
|---|---|---|
| BO1 | BO1 Jan. 1, 2010; 00:00 | Role of ROBERT as on Jan. 1, 2010; 00:00 = Engineer Annual Salary as on Jan. 1, 2010; 00:00 = 2500USD |
| | BO1' Jan. 1, 2011; 00:00 | Role of ROBERT as on Jan. 1, 2011; 00:00 = Senior Engineer Annual Salary as on Jan. 1, 2011; 00:00 = 3000USD |
| BO2 | BO2 Jan. 1, 2010; 00:00 | Performance Rating: 10% of BO1 for '-' rating 12% of BO1 for '=' rating 14% of BO1 for '+' rating |
| | BO2' Jan. 6, 2010; 23:00 | Performance Rating: 9% of BO1 for '-' rating 12% of BO1 for '=' rating 15% of BO1 for '+' rating |
| | BO2'' Jan. 1, 2011; 00:00 | Performance Rating: 9% of BO1 for '-' rating 12% of BO1 for '=' rating 15% of BO1 for '+' rating |
| BO3 | BO3 Jan. 1, 2010; 00:00 | Extra Hours of Worked in Q1 = 2 Hours Q2 = 6 Hours Q3 = 10 Hours Q4 = 20 Hours |
| BO4 | BO4 Jan. 1, 2010; 00:00 | Number of days in 2011 = 365 |
| | BO4' Jan. 1, 2012; 00:00 | Number of days in 2012 = 366 |

Based upon the business definition in Table 4, compiler 132 compiles all the information of the above business case to generate a comprehensive trace map rendered in Table 5.

TABLE 5

ANNUAL BONUS DETERMINATION OF ROBERT FOR YEAR 2011

| BUSINESS RULE | BUSINESS OBJECT | BUSINESS DEFINITION | PROCESS RESULTANT |
|---|---|---|---|
| BR1 = (AS × PR) | AS | 3000 USD; | $Bonus_{2011}$ = 3912 |
| | PR | "=" → 12% of 3000 USD | |
| $BR2 = \left(H \times \frac{AS}{D}\right)$ | H | 38 Extra hours worked | |
| | AS | 3000 USD | |
| | D | 365 days in 2011 | |

Figure 2:
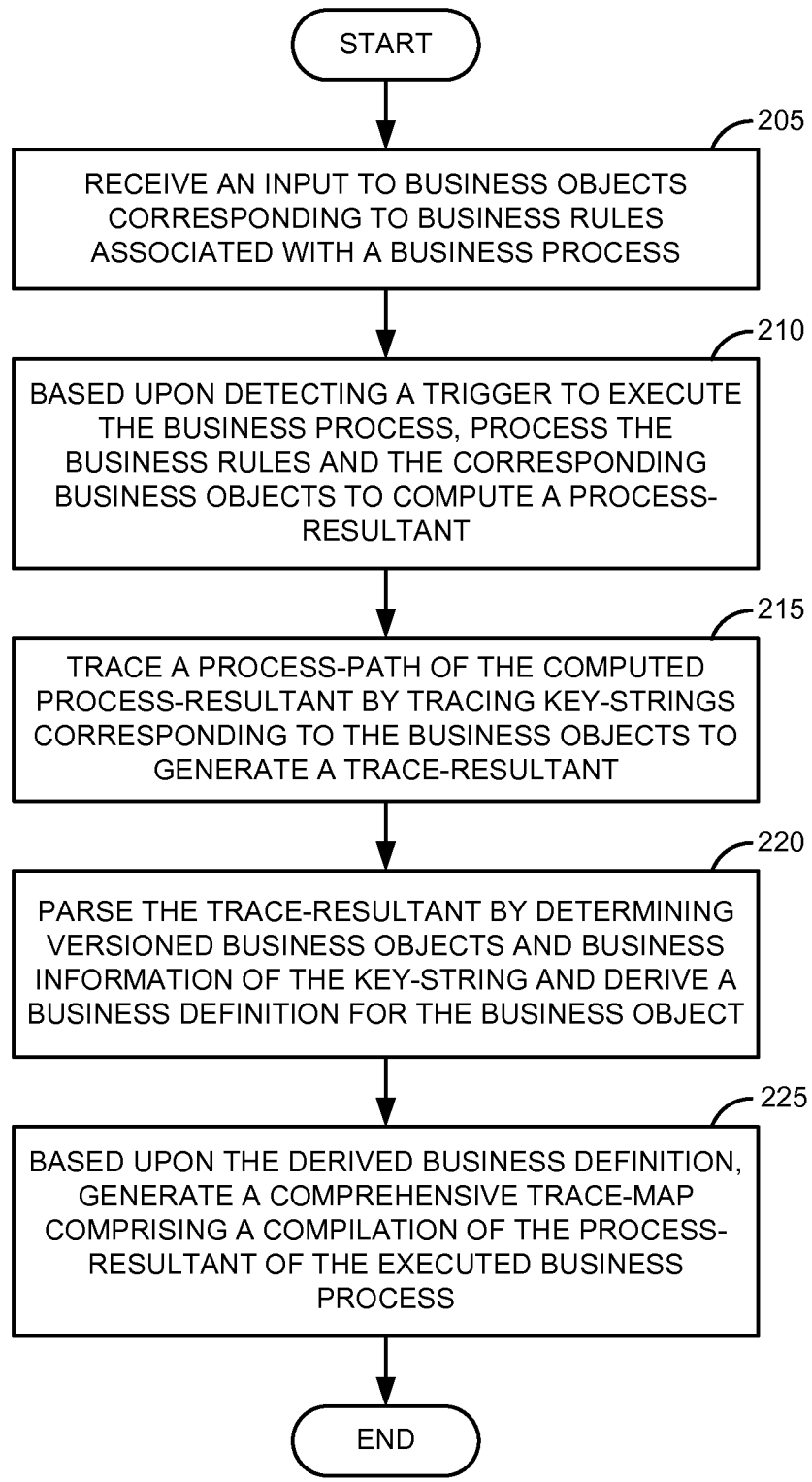
FIG. 2 is a process flow diagram illustrating a computer-implemented method to trace a software execution of a business process, according to an embodiment.

FIG. 2 is a process flow diagram illustrating a computer-implemented method to trace a software execution of a business process, according to an embodiment. In process block 205, an input to business objects corresponding to business rules associated with the business process is received. In an embodiment, the business rules and the corresponding business objects involved in executing the business process are identified. The identified business objects are rendered on a user interface to receive the input. In process block 210, based upon detecting an instruction to trigger the execution the business process, the business rules and corresponding business objects are processed to compute a process-resultant for the business process.

In process block 215, a process-path of the computed process-resultant is traced by tracing key-strings corresponding to the business objects involved in computing the process-resultant, to generate a trace-resultant. A processor or a business processor may be employed to trace the process-path of the computed process-resultant and to generate a trace-resultant. In an embodiment, tracing the key-string includes tracing a key-identifier, a key-value and a time-stamp for each traced business object corresponding to the business rules involved in executing the business process. In another embodiment, generating a trace-resultant includes tracing the key-string of the business objects involved in computing the process-resultant and encoding the traced key-string to generate the trace resultant.

In block 220, the trace-resultant is parsed by determining versioned business objects and business information of the key-strings, to derive a business definition for the traced business objects involved in computing the process-resultant. The processor may be employed to parse the trace-resultant. In an embodiment, the business definition is stored in a universal format for further utilization. In process block 225, based upon the derived business definition, a comprehensive trace-map is generated, comprising a compilation of the process-resultant of the executed business process. In an embodiment, generating the comprehensive trace-map includes decoding the traced key-strings of the business objects involved in computing the process-resultant, determining the object versions of the corresponding business objects and determining dependant objects involved in computing the process-resultant.

Figure 3:
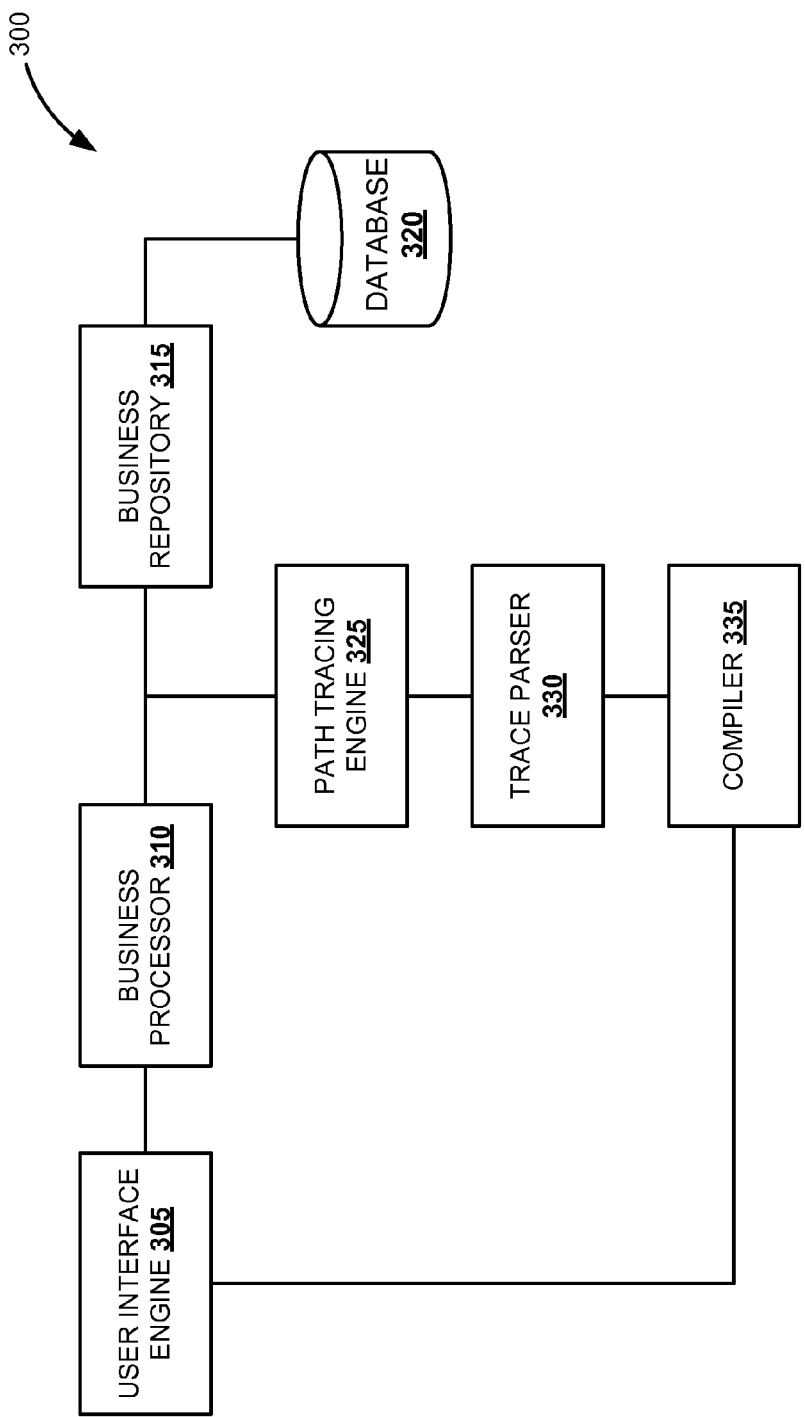
FIG. 3 is a block diagram illustrating a computer system to trace a software execution of a business process, according to an embodiment.

FIG. 3 is a block diagram illustrating a computer system to trace a software execution of a business process, according to an embodiment. Computer system 300 comprises user interface (UI) engine 305, business processor 310, business repository 315, database 320, path tracing engine 325, trace parser 330, and compiler 335. In an embodiment, user interface engine 305 is in communication with business processor 310 and compiler 335. Business processor 310 is in communication with business repository 315 and path tracing engine 325. Path tracing engine 325 is in communication with trace parser 330. Trace parser 330 is further in communication with compiler 335. Business repository 315 is in communication with database 320. In an embodiment, a processor is configured to read and execute instructions stored in one or more memory elements.

Business rules involved in executing the business process and business objects corresponding to the business rules are identified for executing the business process. The identified business objects are rendered on UI engine 305 to receive the input. In an embodiment, UI engine 305 is responsible to receive an input to the business objects corresponding to the business rules that are associated with the business process, from a user interface. UI engine 305 is responsible to receive the input to the business objects and communicate the received input to business processor 310. In an embodiment, UI element 305 may also receive an instruction to trigger the execution the business process and communicate the trigger to business processor 310. Based upon the trigger, business processor 310 processes the business rules and corresponding business objects associated with the business process to compute a process-resultant for the business process.

Business processor 310 notifies path tracing engine 325 and user interface engine 305 regarding the computed process-resultant. UI engine 305 may render the computed process-resultant on the user interface. Path tracing engine 325 traces a process-path of the computed process-resultant by tracing key-strings corresponding to the business objects involved in computing the process-resultant. Path tracing engine 325 may also determine one or more associated dependant business objects or dependant business rules involved in computing the process-resultant. Based upon the process-path, path tracing engine 325 generates a trace-resultant, describing the process-path of the processed business rules and the business object to compute the process-resultant.

Trace parser 330 parses the trace-resultant by determining versioned business objects and business information of the key-string, to derive a business definition for the traced business objects involved in computing the process-resultant. Based upon the derived business definition, compiler 335 decodes the traced key-string of the business objects involved in computing the process-resultant. Compiler 335 also determines versioned business objects and dependant business objects that were involved in computing the process-resultant. Compiler 335 generates a comprehensive trace-map describing a compilation of the process-resultant of the executed business process.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 4:
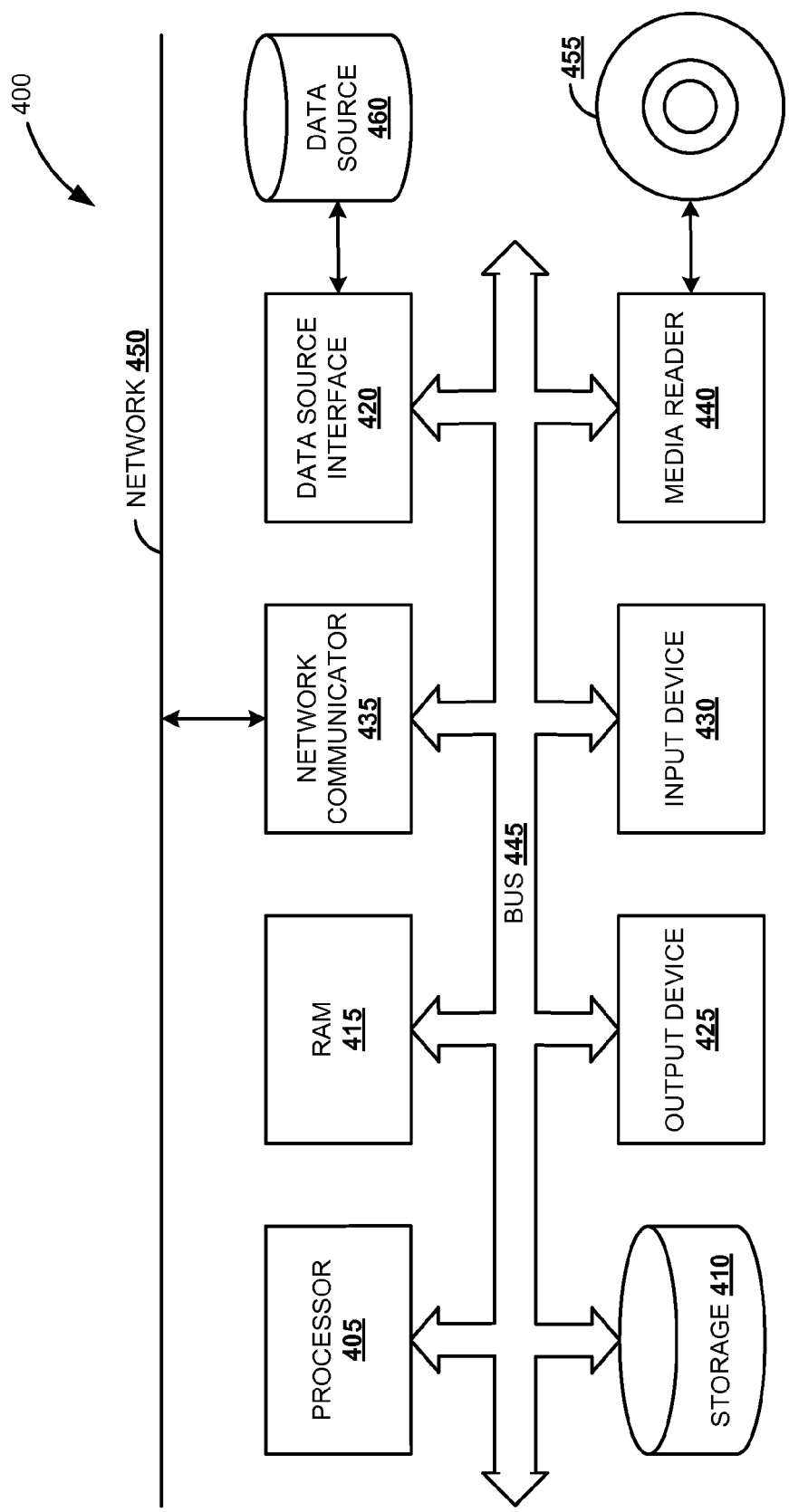
FIG. 4 is a block diagram illustrating an exemplary computer system, according to an embodiment.

FIG. 4 is a block diagram illustrating an exemplary computer system 400. The computer system 400 includes a processor 405 that executes software instructions or code stored on a computer readable storage medium 455 to perform the above-illustrated methods of the invention. The computer system 400 includes a media reader 440 to read the instructions from the computer readable storage medium 455 and store the instructions in storage 410 or in random access memory (RAM) 415. The storage 410 provides a large space for keeping static data where at least some instructions could be stored for later execution. The stored instructions may be further compiled to generate other representations of the instructions and dynamically stored in the RAM 415. The processor 405 reads instructions from the RAM 415 and performs actions as instructed. According to one embodiment of the invention, the computer system 400 further includes an output device 425 (e.g., a display) to provide at least some of the results of the execution as output including, but not limited to, visual information to users and an input device 430 to provide a user or another device with means for entering data and/or otherwise interact with the computer system 400. Each of these output devices 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, continuation servers, data stores, and interfaces, for instance. The modules of the computer system 400 are interconnected via a bus 445. Computer system 400 includes a data source interface 420 to access data source 460. The data source 460 can be accessed via one or more abstraction layers implemented in hardware or software. For example, the data source 460 may be accessed by network 450. In some embodiments the data source 460 may be accessed via an abstraction layer, such as, a semantic layer.

A data source is an information resource. Data sources include sources of data that enable data storage and retrieval. Data sources may include databases, such as, relational, transaction, hierarchical, multi-dimensional (e.g., OLAP), object oriented databases, and the like. Further data sources include tabular data (e.g., spreadsheets, delimited text files), data tagged with a markup language (e.g., XML data), transaction data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer-implemented method to trace an execution of a business process, comprising:
    receiving from a computer generated user interface, an input to one or more business objects corresponding to one or more business rules associated with the business process;
    based upon detecting a trigger to execute the business process, a processor of the computer performing a step of processing the one or more business rules and the corresponding one or more business objects associated with the business process, to compute a process-resultant for the business process;
    the processor tracing a process-path of the computed process-resultant by tracing one or more key-strings corresponding to the business objects to generate a trace-resultant;
    the processor parsing the trace-resultant by determining one or more versioned business objects and business information of the key-strings, and deriving a business definition for the one or more versioned business objects; and
    based upon the derived business definition, the processor generating a comprehensive trace-map, comprising a compilation of the process-resultant of the executed business process, the comprehensive trace-map including a resultant of an evaluation of the process-resultant and a demonstration of the trace-resultant.

2. The computer-implemented method of claim 1 further comprising:
    identifying the business rules involved in executing the business process;
    identifying the business objects corresponding to the business rules; and
    rendering the identified business objects on the computer generated user interface to receive the input.

3. The computer-implemented method of claim 1, wherein tracing the key-strings comprise:
    tracing one or more key-identifiers of the corresponding business objects; and
    tracing one or more key-values describing one or more business values assigned to the corresponding business objects.

4. The computer-implemented method of claim 1, wherein tracing the key-strings comprise: tracing a time-stamp of the business objects.

5. The computer-implemented method of claim 1, wherein tracing the process-path comprises a lean tracing mechanism comprising:
    tracing one or more key-identifiers corresponding to the business objects involved in computing the process-resultant;
    tracing one or more key-values corresponding to the business objects involved in computing the process-resultant;
    tracing one or more time-stamps corresponding to the business objects involved in computing the process-resultant; and
    generating a trace-resultant based upon the traced key-identifiers, the traced key-values and the traced time-stamps of the corresponding business objects involved in computing the process-resultant.

6. The computer-implemented method of claim 1, wherein tracing the process-path includes a strategic tracing mechanism comprising:
    determining the business objects required for generating the process-resultant; and
    tracing the key-strings corresponding to the business object required for generating the trace-resultant.

7. The computer-implemented method of claim 1, further comprising:
    determining one or more modifications occurring on the business objects corresponding to the business rules; and
    versioning the modified business objects to create the versioned business objects.

8. The computer-implemented method of claim 7, further comprising:
    associating a time-stamp with the versioned business objects based upon an instance at which the versioning is performed.

9. The computer-implemented method of claim 1, further comprising: generating a key-string table comprising the key-identifiers, the key-values and the time-stamps of the business objects and the versioned business objects.

10. The computer-implemented method of claim 1, wherein generating the trace-resultant comprises: tracing the key-strings corresponding to the business objects involved in computing the process-resultant; and encoding the traced key-strings to generate the trace resultant.

11. The computer-implemented method of claim 1, wherein deriving a business definition for the traced business objects comprises:
    determining the key-identifiers and the key-values included in the key-strings corresponding to the traced business objects;
    based upon the key-identifiers, determining business information of the corresponding traced business objects;
    based upon the key-values, determining the business values assigned to the corresponding traced business object;

determining the versioned business objects associated with the key-strings corresponding to the traced business objects; and compiling the versioned business objects, the key-identifiers and the key-values of the traced business objects to derive the business definition of the traced business objects.

12. The computer-implemented method of claim 1, wherein generating a comprehensive trace-map comprises:

mapping the business information present in the business definition to the traced business objects;

mapping the versioned business objects to the traced business objects; and generating the trace-map including the business definition, the business information, and the versioned business objects of the traced business objects involved in computing the process-resultant.

13. The computer-implemented method of claim 1, wherein determining the versioned business objects of the key-strings comprise: determining a unique version of the business object associated with a unique time-stamp for the traced business objects.

14. The computer-implemented method of claim 1, wherein generating the comprehensive trace-map comprises:

decoding the traced key-strings corresponding to the business objects involved in computing the business definition;

determining the versioned business objects corresponding to the traced business objects; and determining one or more dependant objects that depend upon the traced business objects involved in computing the process-resultant.

15. The computer-implemented method of claim 1 further comprising:

storing the business definition of the traced business objects in a universal format, to enable the generation of the comprehensive trace-map.

16. A computer system to trace an execution of a business process, comprising:

a processor configured to read and execute instructions stored in one or more memory elements; and the one or more memory elements storing instructions to:
a user interface engine to receive an input to one or more business objects corresponding to one or more business rules associated with the business process;

a business processor to process the one or more business rules and the corresponding business objects associated with the business process and to compute a process-resultant for the business process, based upon detecting a trigger to execute the business process;

a path tracing engine to trace a process-path of the computed process-resultant by tracing one or more key-strings corresponding to the business objects involved in computing the process-resultant and to generate a trace-resultant;

a trace-parser to parse the trace-resultant by determining one or more versioned business objects and business information of the key-strings, and to derive a business definition for the one or more versioned business objects involved in computing the process-resultant; and a compiler to generate a comprehensive trace-map comprising a compilation of the process-resultant of the executed business process, based upon the business definition, the comprehensive trace-map including a resultant of an evaluation of the process-resultant and a demonstration of the trace-resultant.

17. The computer system of claim 16 wherein the business process is associated with a business logic describing a principle of handling the business rules and the business objects and a manner of interaction between the business objects.

18. The computer system of claim 16 further comprises: a business repository to store the business objects, the business rules, a key-string table, the process-resultant, and the trace-resultant.

19. The computer system of claim 16, wherein the business processor renders the process-resultant and the trace-map on a user interface associated with the user interface engine.

20. An article of manufacture including a non-transitory computer readable storage medium to tangibly store instructions, which when executed by a computer, cause the computer to:

receive from a user interface, an input to one or more business objects corresponding to one or more business rules associated with the business process;

based upon detecting a trigger to execute the business process, process the one or more business rules and the corresponding business objects associated with the business process, to compute a process-resultant for the business process;

trace a process-path of the computed process-resultant by employing a processor to trace one or more key-strings corresponding to the business objects involved in computing the process-resultant, and to generate a trace-resultant;

parse the trace-resultant by employing the processor to determine one or more versioned business objects and business information of the key-strings, and to derive a business definition for the one or more versioned business objects involved in computing the process-resultant; and based upon the business definition, generate a comprehensive trace-map comprising a compilation of the process-resultant of the executed business process the comprehensive trace-map including a resultant of an evaluation of the process-resultant and a demonstration of the trace-resultant.

* * * * *